(12) United States Patent
Uekita

(10) Patent No.: US 9,636,794 B2
(45) Date of Patent: May 2, 2017

(54) MACHINE TOOL

(71) Applicant: KABUSHIKI KAISHA TOSHIBA, Minato-ku (JP)

(72) Inventor: Masahiro Uekita, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 23 days.

(21) Appl. No.: 14/729,744

(22) Filed: Jun. 3, 2015

(65) Prior Publication Data
US 2015/0367474 A1 Dec. 24, 2015

(30) Foreign Application Priority Data

Jun. 18, 2014 (JP) .................................. 2014-125248

(51) Int. Cl.
*B23Q 17/22* (2006.01)
*B23Q 1/54* (2006.01)
*B23Q 17/24* (2006.01)
*B23B 39/14* (2006.01)
*B23B 41/16* (2006.01)
(Continued)

(52) U.S. Cl.
CPC .......... *B23Q 17/2275* (2013.01); *B23B 39/14* (2013.01); *B23B 41/16* (2013.01); *B23B 49/00* (2013.01); *B23Q 1/5462* (2013.01); *B23Q 15/12* (2013.01); *B23Q 15/14* (2013.01); *B23Q 17/2428* (2013.01); *B23B 2215/76* (2013.01);
(Continued)

(58) Field of Classification Search
CPC  B23Q 17/2275; B23Q 17/2428; B23Q 15/12; B23Q 15/14; B23B 39/14

USPC .......................................... 33/520, 543, 632
See application file for complete search history.

(56) References Cited

U.S. PATENT DOCUMENTS 6,960,052 B2   11/2005  Lutz et al.
7,938,602 B2 *  5/2011  Ota ..................... B23Q 1/4857
                                                    409/201
(Continued)

FOREIGN PATENT DOCUMENTS

EP      1 308 239 A2    5/2003
EP      1 308 239 A3    5/2003
(Continued)

OTHER PUBLICATIONS

Extended European Search Report issued Oct. 16, 2015 in Patent Application No. 15171241.1.
(Continued)

*Primary Examiner* — Daniel Howell
*Assistant Examiner* — Alan Snyder
(74) *Attorney, Agent, or Firm* — Oblon, McClelland, Maier & Neustadt, L.L.P.

(57) ABSTRACT

The machine tool 1 for machining a hole 3a of a desired size in a workpiece 3, includes: a main shaft 30 holding a tool 2; a spindle unit 40 including a spindle 41 which holds the shaft 30 rotatably on the axis r of rotation, and a housing 42 which covers the periphery of the spindle 41; a drive unit 50 for holding the unit 40 tiltably with respect to the workpiece 3 held by a holder 20, and for moving the unit 40 relative to the workpiece 3; a mount 70 extending from the housing 42 toward the periphery of the shaft 30; and a control section 90 which, based on the results of measurement by distance measurement sensors 82 held by the mount 70, controls the unit 50 so as to correct the inclination of the shaft 30 with respect to the workpiece 3.

9 Claims, 6 Drawing Sheets

(51) Int. Cl.
B23B 49/00 (2006.01)
B23Q 15/12 (2006.01)
B23Q 15/14 (2006.01)

(52) U.S. Cl.
CPC ....... *B23B 2270/48* (2013.01); *Y10T 408/175* (2015.01)

(56) References Cited

U.S. PATENT DOCUMENTS

| | | | | |
|---|---|---|---|---|
| 8,770,051 B2* | 7/2014 | Stamenkovic | ........... | G01B 7/13 33/543 |
| 2003/0123945 A1* | 7/2003 | Lutz | ........................ | B23Q 1/56 409/208 |

FOREIGN PATENT DOCUMENTS

| JP | 2002-96232 A | 4/2002 |
|---|---|---|
| JP | 2007-268682 A | 10/2007 |

OTHER PUBLICATIONS

Office Action issued Aug. 9, 2016 in Korean Patent Application No. 10-2015-0084914 (with English language translation).

\* cited by examiner

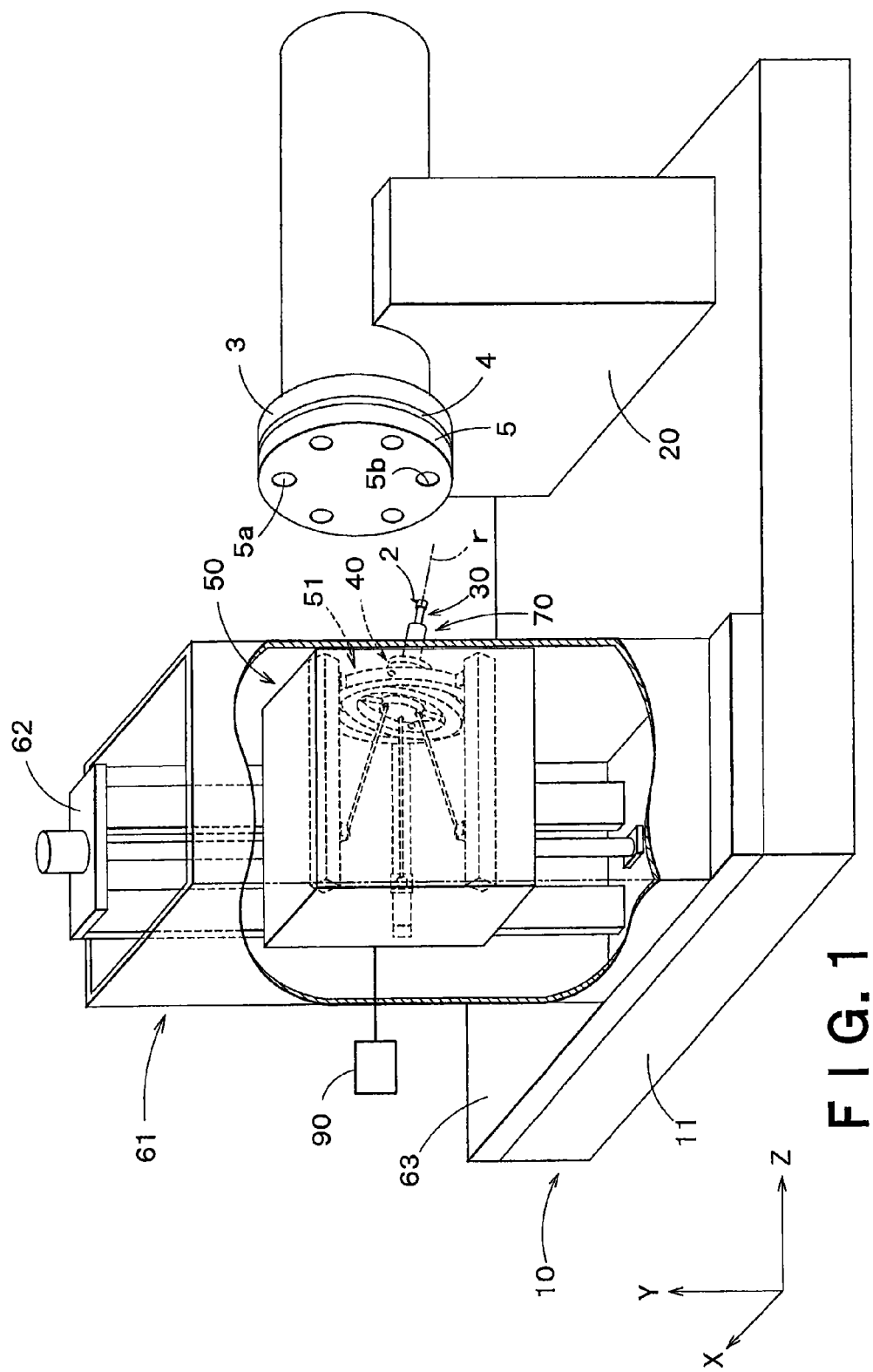
F I G. 1

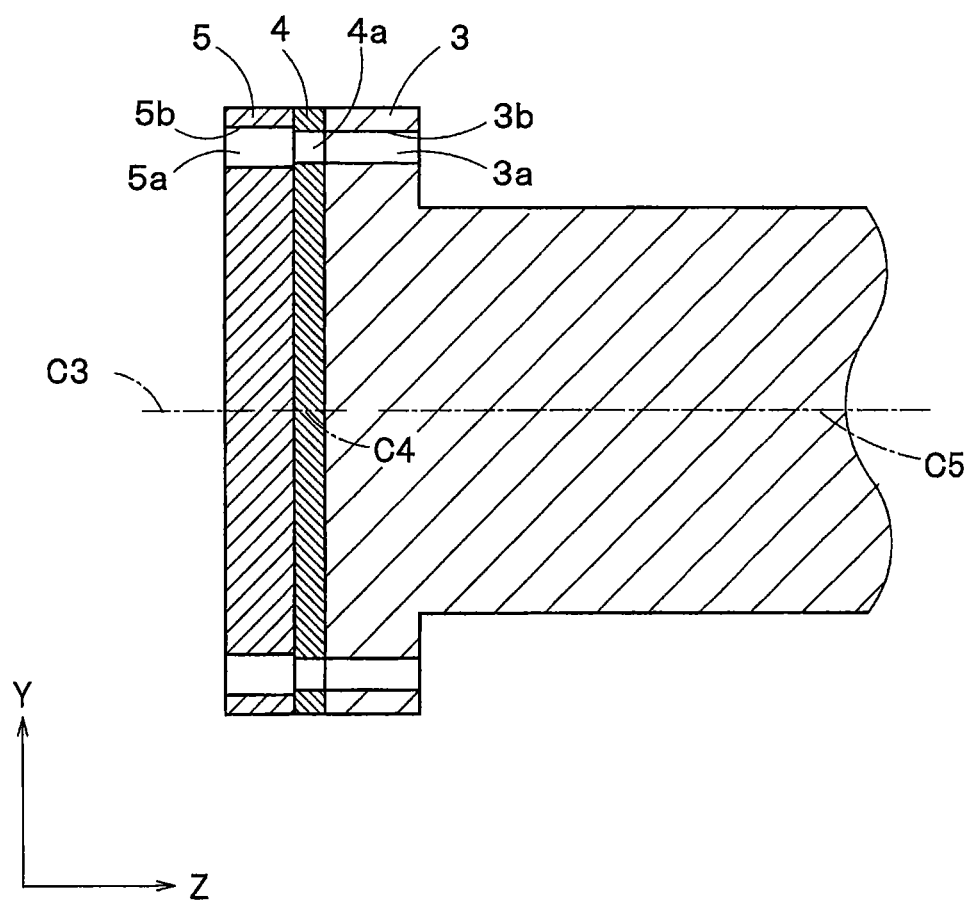
F I G. 2

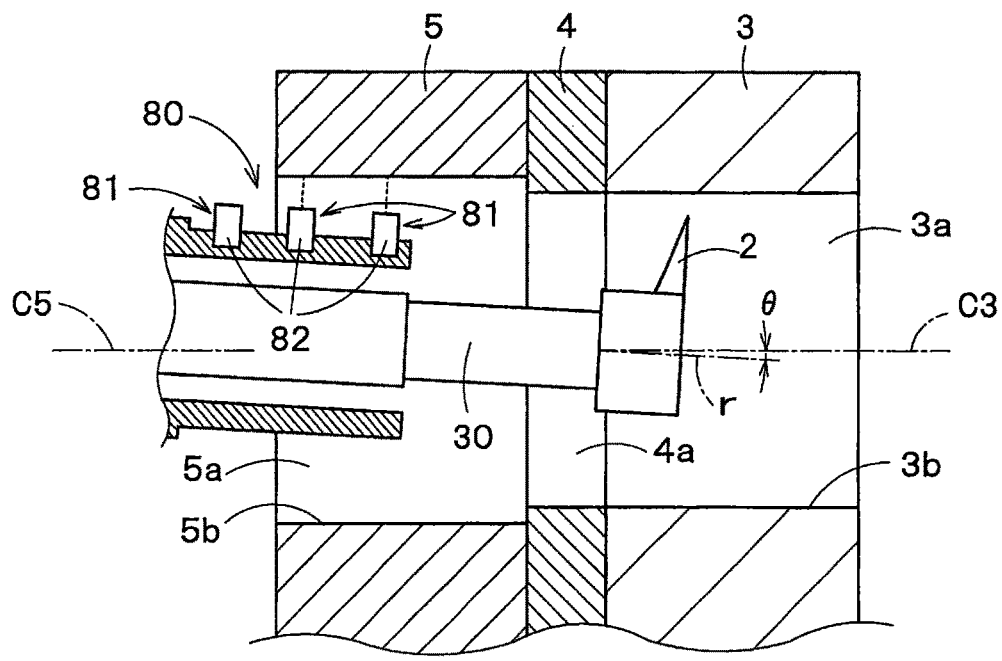
F I G. 6
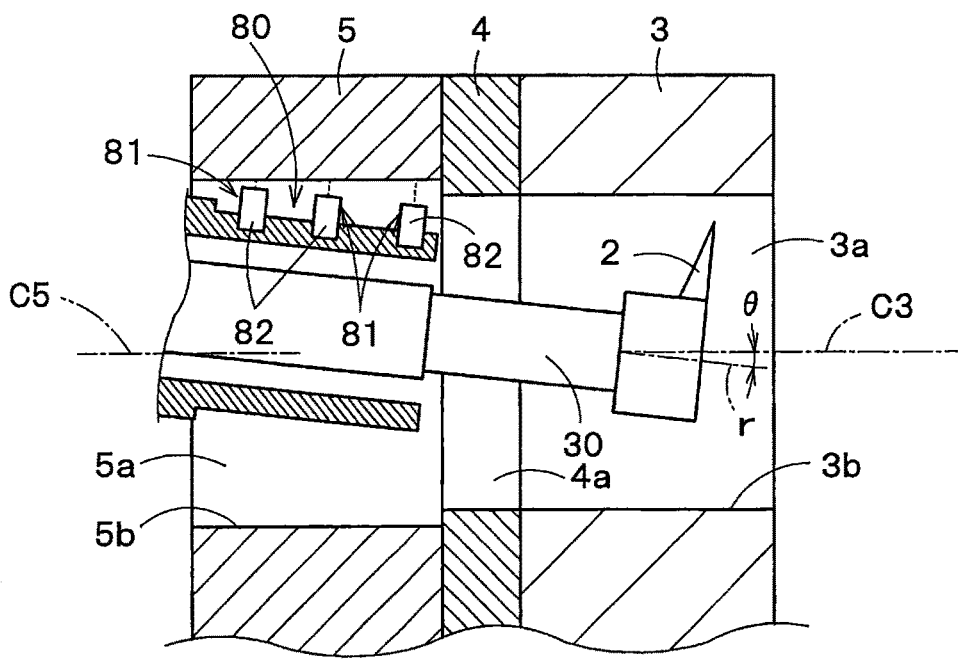
F I G. 7

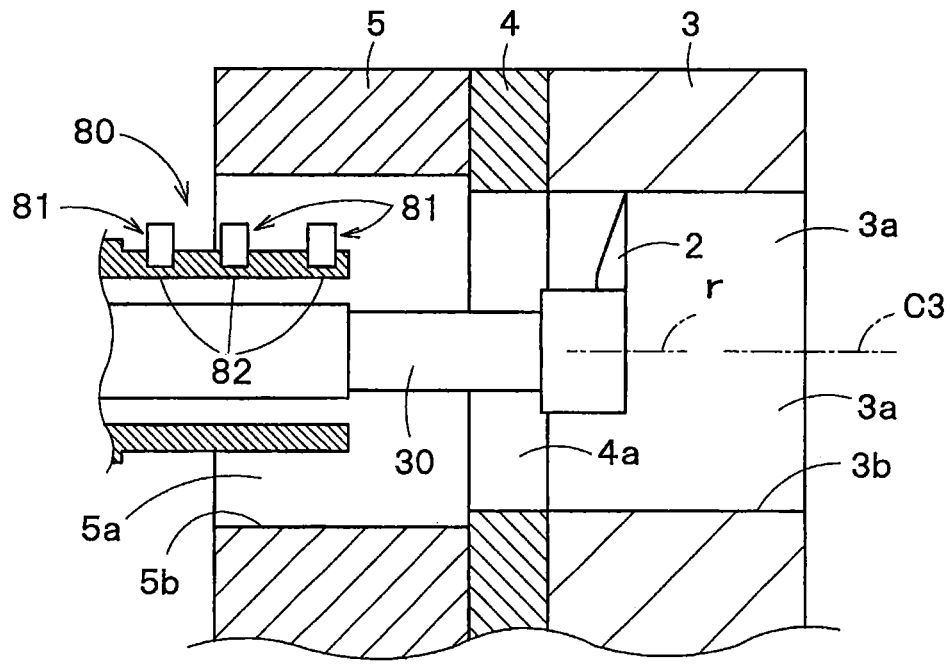
F I G. 8
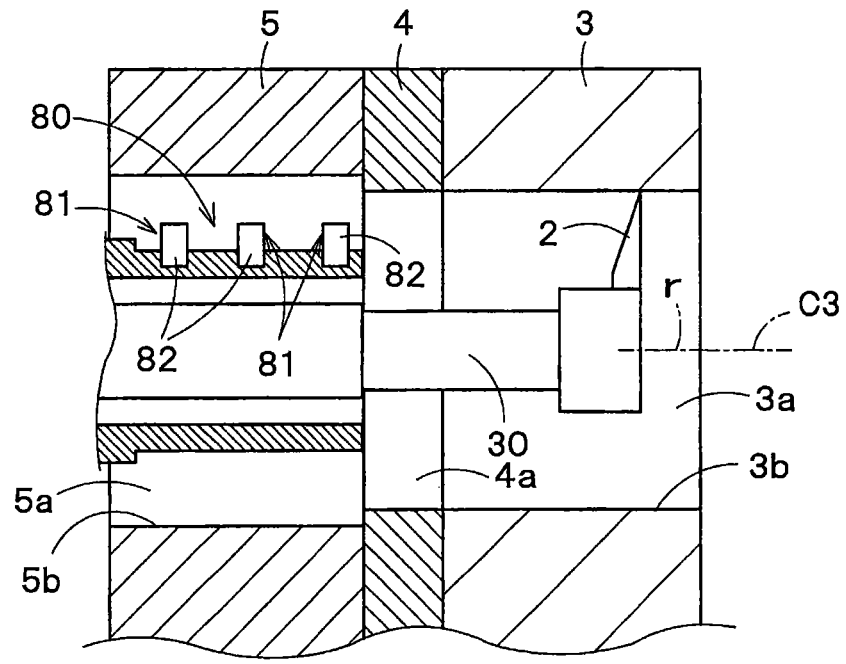
F I G. 9 ns. A flange portion of each rotor component has coupling
MACHINE TOOL

CROSS REFERENCE TO RELATED APPLICATIONS

This application is based upon and claims the benefit of priority from the prior Japanese Patent Application No. 2014-125248, filed on Jun. 18, 2014, the entire contents of which are incorporated herein by reference.

FIELD

The present invention relates to a machine tool.

BACKGROUND

An elongated rotor for a steam turbine, for example, is constructed by assembling axially-divided rotor components. A flange portion of each rotor component has coupling holes for coupling to an adjacent rotor component. A horizontal boring machine having a main shaft which is translatable in orthogonal three axes (X-, Y- and Z-axes) is generally used to produce the precision coupling holes in each rotor component.

In order to couple rotor components directly, the coupling holes are required to be machined with machining accuracy on the order of 30 µm in terms of the cylindricity, position, diameter, etc. of the holes; otherwise a need arises to perform hole machining at coupling portions of the rotor components upon assembling of the rotor components, leading to an increased cost. A calibration method has therefore been developed which not only corrects a translational error in the direction of each of the linear axes (X-, Y- and Z-axes), but also measures and corrects a three-dimensional volumetric error. In particular, a calibration system "Laser Tracer" manufactured by Etalon, Germany, achieves measurement accuracy on the order of submicrons. According to such a technology, in addition to a translational error and a rotational error in the direction of each of the linear axes (X-, Y- and Z-axes), an error in the squareness of the overlapping three axes can also be measured. This makes it possible to measure and correct a three-dimensional spatial error with high accuracy. However, though the conventional method can three-dimensionally correct a volumetric error at the front-end point of a tool, it cannot correct an inclination of a main shaft which may occur upon feeding of the main shaft during deep-hole boring as performed by means of a horizontal boring machine.

SUMMARY OF THE INVENTION

A workpiece is set in a workpiece holder of a machine tool which has been calibrated by, for example, the above-described method. If the workpiece is inclined with respect to a main shaft that holds a tool, then the workpiece holder needs to be adjusted so that the inclination of the workpiece with respect to the main shaft becomes smaller. However, a large-sized workpiece weighs typically as much as tens of tons or more, and therefore it takes a lot of work and time to adjust the workpiece holder.

It is therefore an object of the present invention to provide a machine tool which enables easy adjustment of the inclination of a main shaft with respect to a workpiece.

In order to save work and time for adjustment of a workpiece holder, a method may be considered which involves permitting a certain degree of inclination of a workpiece with respect to a main shaft while, on the other hand, restricting the range of feeding of the main shaft and not utilizing a feeding range which greatly affects the inclination of the workpiece. However, depending on the size of the workpiece, a restriction on the range of feeding of the main shaft could make machining of the workpiece impossible.

In order to achieve the above object, the present invention provides a machine tool for machining a hole of a desired size in a workpiece, comprising: a body portion; a workpiece holder for holding the workpiece, supported on the body portion; a main shaft which holds a tool; a spindle unit including a spindle which holds the main shaft rotatably on the axis of rotation, and a housing which covers the periphery of the spindle; a shaft-tilting translational drive unit for holding the spindle unit in such a manner as to be capable of changing the inclination of the main shaft, held by the spindle unit, with respect to the workpiece, and for moving the spindle unit relative to the body portion 10; a sensor mount secured to the housing and extending from the housing such that it partly surrounds the periphery of the main shaft; a sensor group consisting of sensors held by the sensor mount and each capable of measuring the distance from a measurement target; and a control section which, based on the results of measurement by the sensor group, controls the shaft-tilting translational drive unit so as to correct the inclination of the main shaft with respect to the workpiece.

The machine tool of the present invention can feed the sensor group together with the main shaft in the axial direction of the axis of rotation by means of the shaft-tilting translational drive unit, and can determine the inclination of the main shaft with respect to the workpiece by means of the sensor group. The inclination of the main shaft with respect to the workpiece can be easily adjusted by controlling the shaft-tilting translational drive unit so that the inclination of the main shaft with respect to the workpiece becomes smaller.

BRIEF DESCRIPTION OF THE DRAWINGS

FIG. 1 is a schematic perspective view of an exemplary construction of a machine tool according to an embodiment;

FIG. 2 is a schematic cross-sectional view of a workpiece to which a reference-hole plate is mounted;

FIG. 6 is a diagram illustrating the action of the machine tool shown in FIG. 1, showing the machine tool after feeding the main shaft to a certain position in the axial direction of the axis of rotation and when sensors are measuring the distances from a wall surface that defines a hole provided in a reference-hole plate;

FIG. 7 is a diagram illustrating the action of the machine tool shown in FIG. 1, showing the machine tool after further feeding the main shaft from the position shown in FIG. 6 and when the sensors are measuring the distances from the wall surface that defines the hole provided in the reference-hole plate;

FIG. 8 is a diagram illustrating the action of the machine tool shown in FIG. 1, showing the machine tool upon machining of a hole provided in a workpiece at the same feed position of the main shaft as the position shown in FIG. 6; and FIG. 9 is a diagram illustrating the action of the machine tool shown in FIG. 1, showing the machine tool upon machining of the hole provided in the workpiece at the same feed position of the main shaft as the position shown in FIG. 7.

DETAILED DESCRIPTION

Figure 3:
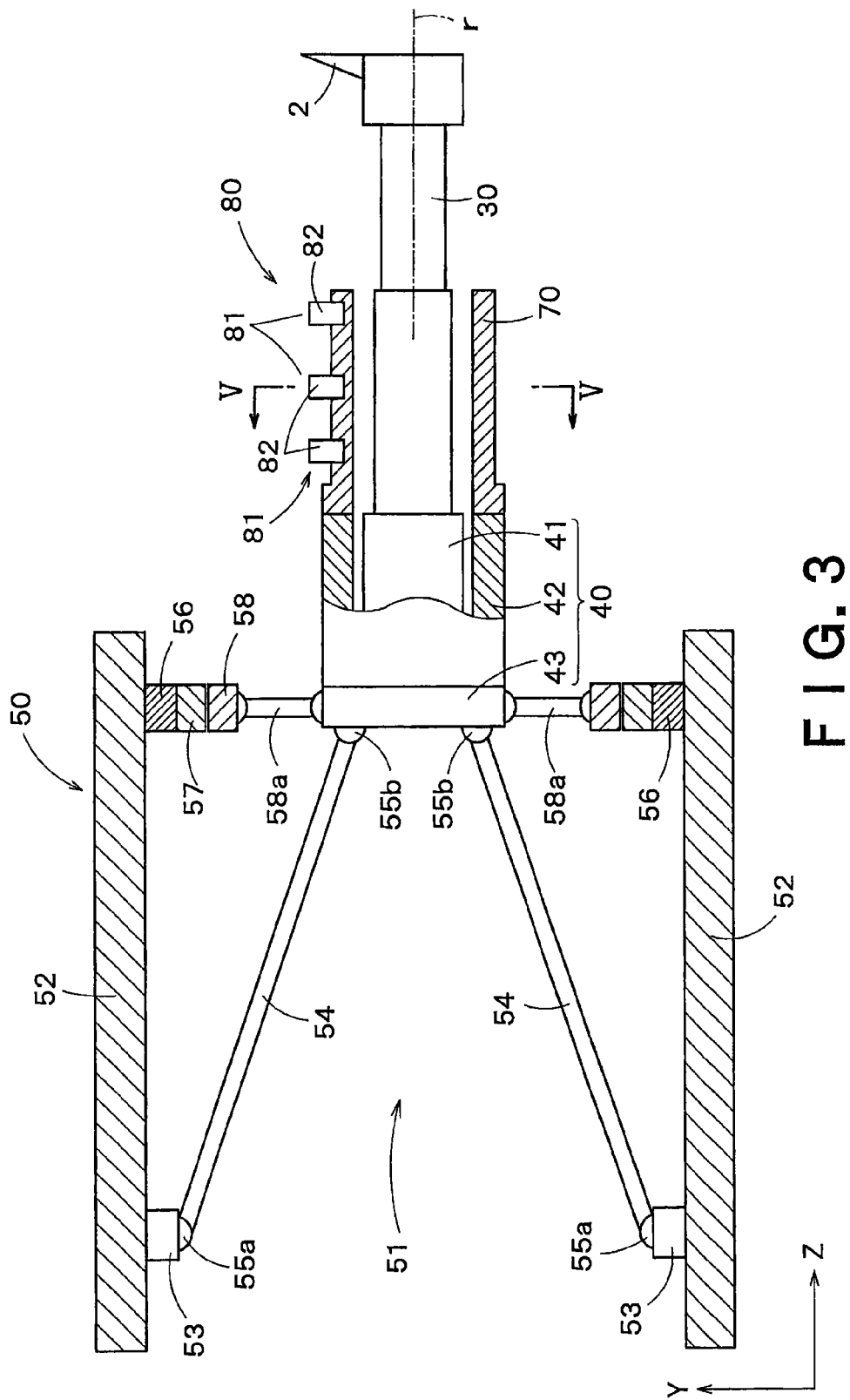
FIG. 3 is a schematic cross-sectional view of a main portion of the machine tool shown in FIG. 1.

Embodiments will now be described with reference to FIGS. 1 through 9. FIG. 1 is a schematic perspective view of an exemplary construction of a machine tool 1 according to an embodiment. The machine tool 1 shown in FIG. 1 is a machine tool for machining holes 3a (see FIG. 2) of a desired size in a workpiece 3. The machine tool 1 is, for example, a horizontal boring machine, a portal milling machine or a gantry-type milling machine. Of these, a horizontal boring machine forms desired holes 3a in the workpiece 3 by rotating a main shaft 30 together with a tool 2 on the axis r of rotation extending in a horizontal direction. A gate-type processing machine or a gantry-type processing machine forms desired holes in a workpiece by rotating a main shaft together with a tool about the axis of rotation extending in the vertical direction. The following description illustrates a case where the machine tool 1 is constructed as a horizontal boring machine. In the following description, Y-axis direction refers to the vertical direction, Z-axis direction refers to a direction in which the main shaft 30 is moved closer to or away from the workpiece in a horizontal plane, and X-axis direction refers to a direction perpendicular to both the Y-axis direction and the Z-axis direction. In one example, the machine tool 1 may be configured such that the range of movement in the X-axis direction is 10.5 m, the range of movement in the Y-axis direction is 2.5 m, and the range of movement in the Z-axis direction is 1.0 m.

The machine tool 1 shown in FIG. 1 is configured especially for machining the workpiece 3 of a large size. It is not easy in machining of a large-sized workpiece, such as the workpiece 3, to ensure machining accuracy on the order of microns due to various causes for errors. Therefore, there has been a demand for increasing machining accuracy in machining of a large-sized workpiece. In the machine tool 1 for machining the large-sized workpiece 3, the positioning accuracy in each of the X-, Y- and Z-axis directions is controlled e.g. in the range of 0.005 to 0.010 mm.

As shown in FIG. 1, the machine tool 1 includes a body portion 10 installed on the floor of a building, and a workpiece holder 20 for holding the workpiece 3, supported on the body portion 10. The body portion 10 comprises a bed 11 installed on the floor of the building. The bed 11 has the shape of a horizontally-extending flat plate.

The workpiece holder 20 positions with high accuracy the workpiece 3 as a processing object with respect to the body portion 10. The workpiece holder 20 is also called a support. Any conventional workpiece holder, which is known in the art of machine tools, can be used as the workpiece holder 20, and hence a detailed description thereof will be omitted.

FIG. 2 shows an example of the workpiece 3 held on the workpiece holder 20. The workpiece 3 shown in FIG. 2 is a rotor component constituting part of a rotor for a steam turbine. The rotor for a steam turbine is constructed by assembling a plurality of such rotor components 3. Each rotor component 3 has a cylindrical shape. Each rotor component 3 has a plurality of coupling holes 3a for coupling to an adjacent rotor component 3. The coupling holes 3a are arranged circumferentially in a peripheral area of the rotor component 3. The coupling holes 3a of the rotor component 3, shown in FIG. 2, are formed as pilot holes. The machine tool 1 of this embodiment is configured to perform finish machining of the precision holes.

A reference-hole plate 5 is mounted to the main shaft 30 facing surface of the workpiece 3. The reference-hole plate 5 is used to efficiently determine an inclination θ (see FIG. 7) of the main shaft 30 with respect to the workpiece 3, which can change with the feed of the main shaft 30 in the axial direction of the axis r of rotation, as will be described in more detail below. The reference-hole plate 5 of this embodiment is mounted to the workpiece 3 via a spacer 4. The spacer 4 is provided to form a gap between the workpiece 3 and the reference-hole plate 5. In one example, the length of the reference-hole plate 5 in the Z-axis direction may be approximately equal to the length of the workpiece 3 and longer than the length of the spacer 4 in the Z-axis direction.

As shown in FIG. 2, the spacer 4 and the reference-hole plate 5 have holes 4a and holes 5a, respectively, corresponding to the coupling holes 3a of the workpiece 3. Each hole 3a of the workpiece 3, the corresponding hole 4a of the spacer 4 and the corresponding hole 5a of the reference-hole plate 5 overlap when viewed in the Z-axis direction. The position accuracy for the reference-hole plate 5 is ensured by using, for example, a high-precision touch probe (e.g. RMP 600 manufactured by Renishaw) or a contact-type dial gauge so that the center line C3 of each hole 3a of the workpiece 3, the center line C4 of the corresponding hole 4a of the spacer 4 and the center line C5 of the corresponding hole 5a of the reference-hole plate 5 coincide when viewed in the Z-axis direction.

In order to perform precision boring by using the reference-hole plate 5, it may be considered to employ a method which involves attaching a portable boring tool to the reference-hole plate 5 (U.S. Pat. No. 6,074,139). Low-cost machining of holes can be expected if coaxial finish boring of the workpiece 3 can be performed after inserting the portable boring tool into a reference hole. However, part of the portable boring tool needs to be directly inserted into the reference-hole plate 5. The method thus has the drawback of difficult handling of the boring tool.

Furthermore, there is a need to take into account an insertion tolerance in ensuring the position of a hole. Depending on the insertion tolerance set, there is a possibility of variation in the accuracy of the position of the hole. Setting of a small insertion tolerance ensures high accuracy of the position of the hole, but entails difficult handling of the boring tool.

FIG. 3 is a schematic vertical cross-sectional view of a main portion of the machine tool shown in FIG. 1. As shown in FIG. 3, the machine tool 1 further includes the main shaft 30 which holds a tool 2, a spindle unit 40 which holds the main shaft 30 rotatably on the axis r of rotation, and a shaft-tilting translational drive unit 50 for holding the spindle unit 40 in such a manner as to be capable of changing the inclination θ of the main shaft 30, held by the spindle unit 40, with respect to the workpiece 3, and for moving the spindle unit 40 relative to the body portion 10.

The main shaft 30 holding the tool 2 extends from the spindle unit 40 in the direction of the axis r of rotation. The main shaft 30, at its front end, holds the tool 2 at a predetermined angle, and rotates together with the tool 2 by the rotary drive of the spindle unit 40. The tool 2 projects from the front end of the main shaft 30 in a direction perpendicular to the axis r of rotation. In this embodiment, the amount of projection of the tool 2 from the front end of the main shaft 30 can be adjusted. The size of the machined holes 3a can be adjusted by adjusting the amount of projection of the tool 2.

On the other hand, the spindle unit 40 includes a spindle 41 which holds the main shaft 30 rotatably on the axis r of rotation, a housing 42 which covers the periphery of the spindle 41, and a base plate 43 to which the spindle 41 and the housing 42 are mounted. The base end of the main shaft 30 is inserted into the spindle 41 in the direction of the axis r of rotation. The spindle 41 has a built-in motor so that the spindle 41 can rotate on the axis r of rotation. When the spindle 41 rotates, the main shaft 30 held by the spindle 41 also rotates on the axis r of rotation.

In the embodiment shown in FIG. 3, the spindle 41 is supported by the base plate 43. The base plate 43 is comprised of a disk-shaped member. The housing 42 extends from the peripheral end of the base plate 43 such that it covers the periphery of the spindle 41. The housing 42 is secured to the base plate 43 and spaced apart from the spindle 41. Accordingly, the housing 42 does not rotate on the axis r of rotation when the spindle 41 rotates on the axis r of rotation. The below-described sensor mount 70 is secured to the housing 42.

The shaft-tilting translational drive unit 50 is connected to the base plate 43 of the spindle unit 40 so that the base plate 43 can be tilted with respect to the workpiece 3. As shown in FIG. 1, the shaft-tilting translational drive unit 50 includes a shaft tilting section 51 for holding the spindle unit 40 in such a manner as to be capable of changing the inclination θ of the main shaft 30, held by the spindle unit 40, with respect to the workpiece 3, and a translational drive section 61 for moving the shaft tilting section 51 relative to the body portion 10. The shaft tilting section 51 is also configured to be capable of moving the spindle unit 40 closer to and away from the workpiece 3.

Figure 4:
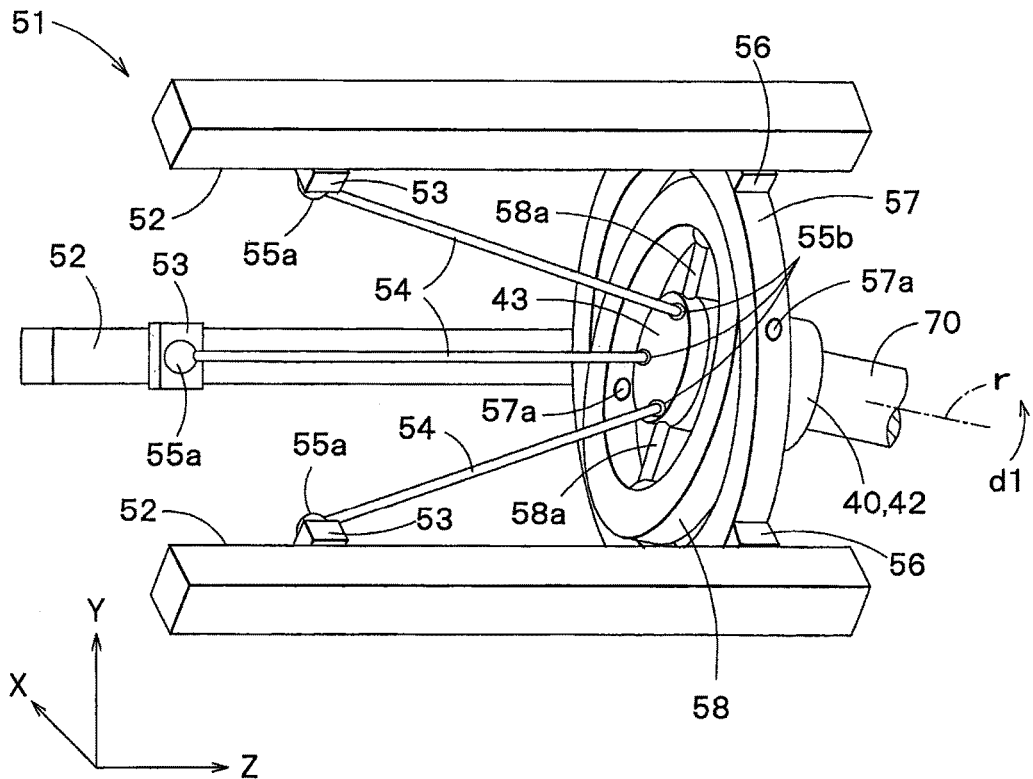
FIG. 4 is a perspective view of a shaft tilting section of a shaft-tilting translational drive unit of the machine tool shown in FIG. 1.

First, the shaft tilting section 51 will be described with reference to FIG. 4. FIG. 4 is a perspective view of the shaft tilting section 51. As shown in FIG. 4, the shaft tilting section 51 includes three linear guide rails 52 extending in the Z-axis direction, three driving sliders 53 each disposed slidably on the corresponding guide rail 52, and link rods 54 each extending between the corresponding driving slider 53 and the base plate 43 and pivotable with respect to the driving slider 53 and the base plate 43.

As shown in FIG. 4, the three linear guide rails 52 are disposed such that they surround the periphery of the base plate 43. The three linear guide rails 52 are disposed at 120-degree intervals along the rotational direction d1 of the axis r of rotation.

Each driving slider 53 is slidably disposed on the corresponding linear guide rail 52. Each driving slider 53 is coupled to a not-shown actuator so that the drive slide 53 can move in the Z-axis direction along the linear guide rail 52. Each driving slider 53 is coupled to the base plate 43 via the link rod 54. In this embodiment each driving slider and the link rod 54 are coupled by a three-degree-of-freedom spherical joint 55a, and the link rod 54 and the base plate 43 are coupled by a two-degree-of-freedom universal joint 55b.

Three driven sliders 56 are each slidably disposed on the corresponding linear guide rail 52 at a position closer to the main shaft 30 than the driving slider 53. An annular first ring member 57, secured to the three driven sliders 56, is fixed in an area surrounded by the three driven sliders 56. The first ring member 57 can move translationally in the Z-axis direction by movement of the three driven sliders 56 along the linear guide rails 52.

Further, as shown in FIG. 4, an annular second ring member 58 is supported by the first ring member 57 via a first connecting shaft 57a extending in the X-axis direction. Therefore, the second ring member 58 is rotatable about the X-axis direction with respect to the first ring member 57. In this embodiment the second ring member 58 surrounds the periphery of the base plate 43. A second connecting shaft 58a, extending in the Y-axis direction, is connected to the second ring member 58 and the base plate 43. The second connecting shaft 58a is rotatably supported by the second ring member 58 via a rotary joint and fixed to the base plate 43. Therefore, the base plate 43 is rotatable about the Y-axis direction with respect to the second ring member 58.

According to the thus-constructed shaft tilting section 51, the inclination θ of the spindle unit 40 and the main shaft 30 with respect to the workpiece 3 can be adjusted by moving each driving slider 53 on the corresponding linear guide rail 52 independently of the other driving sliders 53. Furthermore, the spindle unit 40 can be moved in the Z-axis direction, i.e. can be moved closer to and away from the workpiece 3, by moving the three driving sliders 53 the same distance in the Z-axis direction.

As shown in FIG. 1, the shaft tilting section 51 is supported by the translational drive section 61 so that it can move relative to the body portion 10. The translational drive section 61 supporting the shaft tilting section 51 extends upward in the vertical direction (Y-axis direction) from the bed 11 and faces the workpiece holder 20 in the Z-axis direction. The translational drive section 61 shown in FIG. 1 supports the shaft tilting section 51 such that it can move translationally in two directions: the Y-axis direction and the X-axis direction. In this embodiment the translational drive section 61 includes an X-axis direction drive element 63 for moving the spindle unit 40 together with the shaft tilting section 51 in the X-axis direction, and a Y-axis direction drive element 62 for moving the spindle unit 40 together with the shaft tilting section 51 in the Y-axis direction. As described above, in this embodiment movement of the spindle unit 40 in the Z-axis direction is performed by the shaft tilting section 51.

By the way, in the machine tool 1 for machining the large-sized workpiece 3, an inclination of the main shaft 30 with respect to the workpiece 3 could make it difficult to ensure machining accuracy on the order of microns. In view of this, in order to easily determine and adjust the inclination θ of the main shaft 30 with respect to the workpiece 3, the machine tool 1 of this embodiment further includes a sensor mount 70 which extends from the housing 42 of the spindle unit 40 such that it partly surrounds the periphery of the main shaft 30, a sensor group 80 consisting of sensors 82 held by the sensor mount 70, and a control section 90 which, based on the results of measurement by the sensor group 80, controls the shaft-tilting translational drive unit 50 so as to correct the inclination θ of the main shaft 30 with respect to the workpiece 3. According to the machine tool 1 having such a construction, the inclination θ of the main shaft 30 with respect to the workpiece 3 can be determined by using the sensors 82, whereby the shaft-tilting translational drive unit 50 can be controlled so that the inclination θ of the main shaft 30 with respect to the workpiece 3 becomes smaller.

The sensor mount 70 will be described first, and then the sensors 82 held by the sensor mount 70 will be described. As shown in FIG. 3, the sensor mount 70 has a hollow cylindrical shape; and the main shaft 30 extends through the hollow portion to the outside of the sensor mount 70 in the axial direction of the axis r of rotation. The sensor mount 70 extends from the end of the housing 42, with a gap being formed between it and the main shaft 30. The sensor mount 70 shown in FIG. 3 surrounds that portion of the main shaft 30 which ranges from the base end, mounted to the spindle 41, to an intermediate position between the base end and the front end.

The sensor mount 70 is fixed to the housing 42 of the spindle unit 40. Accordingly, the sensor mount 70 does not rotate on the axis r of rotation when the main shaft 30 rotates together with the spindle 41 on the axis r of rotation.

The sensor group 80 consisting of the sensors 82 is held by the sensor mount 70. Each sensor 82 can measure the distance from a measurement target. The term "measurement target" herein refers to a position on an object whose distance from a sensor 82 is to be measured by the sensor 82 in order to determine the inclination θ of the main shaft 30 with respect to the workpiece 3. In this embodiment, a measurement target may be a position on a wall surface 3b that defines a hole 3a of the workpiece 3 or a position on a wall surface 5b that defines a hole 5a of the reference-hole plate 5. As will be described below, the inclination θ of the main shaft 30 with respect to the workpiece 3 can be determined by measuring the distances between a plurality of sensors 82 and measurement targets by means of the sensors 82.

Figure 5:
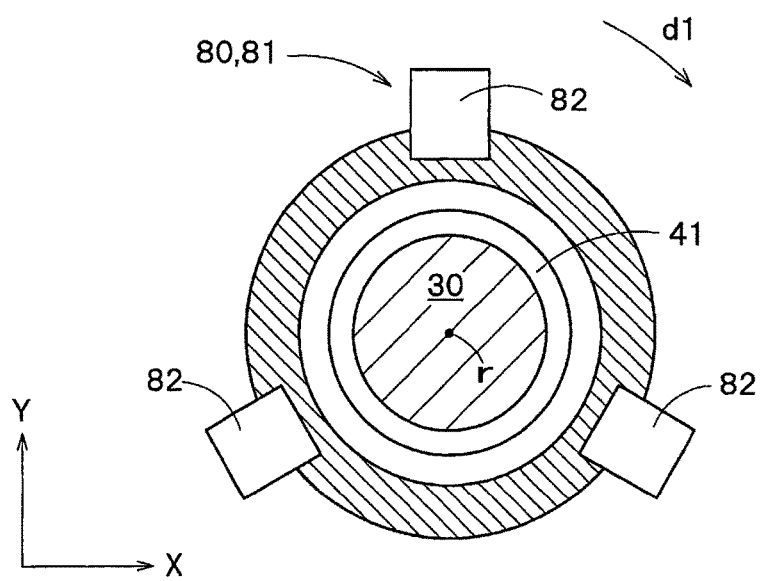
FIG. 5 is a schematic cross-sectional view of the machine tool taken along the line V-V of FIG. 3.

FIG. 5 is a cross-sectional view showing the main shaft 30 and sensors 82 in a cross-section perpendicular to the axis r of rotation. As shown in FIG. 5, the sensor group 80 consists of of small sensor groups 81 each consisting of sensors 82 arranged in the rotational direction d1 of the axis r of rotation. In this embodiment the sensors 82 of each small sensor group 81 are arranged at regular intervals along the rotational direction d1 of the axis r of rotation. In other words, the sensors 82 of each small sensor group 81 are arranged rotationally symmetrically about the axis r of rotation. In the embodiment illustrated in FIG. 5, each small sensor group 81 consists of three sensors 82 arranged at 120-degree intervals along the rotational direction d1 of the axis r of rotation.

As shown in FIG. 3, the small sensor groups 81 are arranged along the axial direction of the axis r of rotation. In this embodiment three small sensor groups 81 are arranged at regular intervals along the axial direction of the axis r of rotation. The arrangement of the sensors 82 of the sensor group 80 in this embodiment is merely an example and may be appropriately determined depending on the specification. For example, the sensors 82 of each small sensor group 81 may be arranged at different intervals along the rotational direction d1 of the axis r of rotation. The small sensor groups 81 may be arranged at different intervals along the axial direction of the axis r of rotation.

The sensors 82 of this embodiment are each comprised of a non-contact displacement meter, in particular a non-contact absolute distance meter. A small-head high-precision sensor, such as a capacitance displacement meter (Lion Precision) or an eddy-current displacement meter, is an exemplary non-contact displacement meter. Another exemplary non-contact displacement meter is a multi-channel fiber distance meter (Etalon Multiline manufactured by Etalon, Germany). An absolute distance meter can achieve absolute distance measuring accuracy on the order to submicrons to several microns.

A description will now be given of the control section 90 which controls the shaft-tilting translational drive unit 50 based on the results of measurement by the sensors 82. The control section 90 is configured to control the shaft-tilting translational drive unit 50 based on the results of measurement by the sensors 82 of the sensor group 80, thereby correcting the inclination θ of the main shaft 30 with respect to the workpiece 3.

An example of control by the control section 90 will be described with reference to FIGS. 6 through 9. FIGS. 6 through 9 illustrate the action of the machine tool 1 performed under control of the control section 90. Prior to machining of the workpiece 3, the reference-hole plate 5 is mounted via the spacer 4 to the main shaft 30-facing surface of the workpiece 3. The reference-hole plate 5 is fixed to the workpiece 3 by, for example, inserting a not-shown bolt into some of the holes 3a of the workpiece 3 and some of the holes 5a of the reference-hole plate 5. After mounting the reference-hole plate 5 to the workpiece 3, the position accuracy for the reference-hole plate 5 is ensured by using, for example, a high-precision touch probe or a contact-type dial gauge.

After completion of the preparatory operations, the control section 90 controls the shaft-tilting translational drive unit 50 to feed the main shaft 30 together with the sensor group 80 into a hole 5a of the reference-hole plate 5 as shown in FIG. 6. In the machine tool 1 of this embodiment, at least at the feed position of the main shaft 30 shown in FIG. 6, the sensors 82 of the small sensor groups 81 lying in the hole 5a of the reference-hole plate 5 each measure the distance from a position on the wall surface 5b that defines the hole 5a of the reference-hole plate 5.

In particular, in this embodiment the sensor group 80 comprises the small sensor groups 81 each consisting of the sensors 82 arranged in the rotational direction d1 of the axis r of rotation (see FIG. 5). The sensor group 80 having such a construction can determine the distance between the center line C5 of the hole 5a of the reference-hole plate 5 and the axis r of rotation in a plane perpendicular to the axis r of rotation and in which each small sensor group 81 lies. In other words, the sensor group 80 can determine the distance between the center line C5 of the hole 5a of the reference-hole plate 5 and the axis r of rotation at a position in the axial direction of the axis r of rotation where each small sensor group 81 is located. From the viewpoint of determining the distance between the center line C5 of the hole 5a of the reference-hole plate 5 and the axis r of rotation, each small sensor group 81 preferably consists of at least three sensors 82 arranged in the rotational direction d1 of the axis r of rotation. Because the small sensor groups 81 are arranged along the axial direction of the axis r of rotation, the distance between the center line C5 of the hole 5a of the reference-hole plate 5 and the axis r of rotation can be compared between the planes perpendicular to the axis r of rotation and in which the small sensor groups 81 are located. This comparison can determine the inclination θ of the axis r of rotation with respect to the center line C3 of the hole 3a of the workpiece 3, i.e. the inclination θ of the main shaft 30 with respect to the workpiece 3. A known method may be employed for the control section 90 to calculate the inclination θ of the main shaft 30 with respect to the workpiece 3 from the results of measurement by the sensor group 80. For example, a method can be employed which involves converting analog signals from the sensor group 80 into digital signals by means of an AD converter, sending the digital signals into the control section 90, and sending signals which optimize the inclination θ of the main shaft 30 with respect to the workpiece 3 from the control section 90 to the shaft tilting section 51.

The hole 3a of the workpiece 3 may be machined after correcting the inclination of the main shaft 30 with respect to the workpiece 3 by using the inclination θ of the main shaft 30 with respect to the workpiece 3, which has been determined based on the results of measurement as performed by the sensor group 80 when the main shaft 30 lies at a certain feed position, without regard to the machining position of the main shaft 30. In this case, the hole 3a of the workpiece 3 can be machined after correcting at least the inclination of the main shaft 30 with respect to the workpiece 3 due to a positioning error or an installation error upon mounting of the workpiece 3 on the workpiece holder 20. However, depending on the specification of the machine tool 1, the inclination θ of the main shaft 30 with respect to the workpiece 3 can change with the feed of the main shaft 30 in the axial direction of the axis r of rotation. Especially when the main shaft 30 is moved by the shaft-tilting translational drive unit 50 in a wide range in the Z-axis direction, the inclination θ of the main shaft 30 with respect to the workpiece 3 is likely to change with the feed of the main shaft 30 in the axial direction of the axis r of rotation. Therefore, as will be appreciated from FIG. 7, the control section 90 of this embodiment continues to feed the sensor group 80 together with the main shaft 30 in the axial direction of the axis r of rotation past certain different feed positions. At each of the different feed positions (e.g. the positions shown in FIGS. 6 and 7) of the main shaft 30, sensors 82 of the sensor group 80, at different positions in the axial direction of the axis r of rotation, measure the distances from the wall surface 5b that defines the hole 5a of the reference-hole plate 5. Based on the results of measurement as performed by the sensor group 80 when the main shaft 30 lies at the feed position shown in FIG. 6, the control section 90 can determine the inclination θ of the main shaft 30 with respect to the workpiece 3 at the feed position shown in FIG. 6 independently of the inclination θ of the main shaft 30 with respect to the workpiece 3 at the feed position shown in FIG. 7. The control section 90 of this embodiment can thus determine the inclination θ of the main shaft 30 with respect to the workpiece 3 according to the feed of the main shaft 30 in the axial direction of the axis r of rotation.

Next, based on the results of measurement by the sensors 82 of the sensor group 80, the control section 90 controls the shaft-tilting translational drive unit 50 to machine the hole 3a of the workpiece 3 while correcting the inclination θ of the main shaft 30 with respect to the workpiece 3. More specifically, as shown in FIG. 8, the control section 90 moves the main shaft 30 in the axial direction of the axis r of rotation to insert the tool 2, held by the main shaft 30, into the reference-hole plate 5. Next, the control section 90 adjusts the amount of projection of the tool 2 from the front end of the main shaft 30 in accordance with the size of the hole 3a to be finish-machined. Next, the control section 90 performs finish machining of the hole 4a of the spacer 4 and the hole 3a of the workpiece 3 by boring while controlling the shaft tilting section 51 so that the inclination θ of the main shaft 30 with respect to the workpiece 3 becomes smaller. In this manner, the tool 2 rotating on the axis r of rotation machines the wall surface 3b that defines the hole 3a of the workpiece 3.

In this embodiment the control section 90 is configured to correct the inclination θ of the main shaft 30 with respect to the workpiece 3 according to the feed of the main shaft 30 in the axial direction of the axis r of rotation. This makes it possible to perform finish machining of the hole 3a of the workpiece 3 while controlling the shaft tilting section 51 so that the inclination θ of the main shaft 30 with respect to the workpiece 3 always becomes smaller even when the inclination θ of the main shaft 30 with respect to the workpiece 3 changes with the feed of the main shaft 30 in the axial direction of the axis r of rotation.

In the illustrated embodiment, the feed position of the main shaft 30 shown in FIG. 6 is the same as the feed position of the main shaft 30 shown in FIG. 8, and the feed position of the main shaft 30 shown in FIG. 7 is the same as the feed position of the main shaft 30 shown in FIG. 9. At the feed position of the main shaft 30 shown in FIG. 8, the inclination of the main shaft 30 with respect to the workpiece 3 is corrected in an amount corresponding to the inclination θ of the main shaft 30 with respect to the workpiece 3 determined at the feed position of the main shaft 30 shown in FIG. 6. Likewise, at the feed position of the main shaft 30 shown in FIG. 9, the inclination of the main shaft 30 with respect to the workpiece 3 is corrected in an amount corresponding to the inclination θ of the main shaft 30 with respect to the workpiece 3 determined at the feed position of the main shaft 30 shown in FIG. 7. Thus, the amount of correction of the inclination of the main shaft 30 with respect to the workpiece 3, as made by the control section 90 of this embodiment at each of the different feed positions (e.g. the positions shown in FIGS. 8 and 9) of the main shaft 30 in the axial direction of the axis r of rotation, corresponds to, in particular corresponds exactly to, the inclination of the main shaft 30 with respect to the workpiece 3 determined from the results of measurement, performed by the sensors 82 at the same feed position (e.g. the position shown in FIG. 6 or 7), of the distances between the sensors 82 and the wall surface 5b that defines the hole 5a of the reference-hole plate 5.

As described hereinabove, the machine tool 1 of this embodiment comprises: the body portion 10; the workpiece holder 20 for holding a workpiece 3, supported on the body portion 1; the main shaft 30 which holds the tool 2; the spindle unit 40 including the spindle 41 which holds the main shaft 30 rotatably on the axis r of rotation, and the housing 42 which covers the periphery of the spindle 41; the shaft-tilting translational drive unit 50 for holding the spindle unit 40 tiltably with respect to the workpiece 3 and for moving the spindle unit 40 relative to the body portion 10; the sensor mount 70 secured to the housing 42 and extending from the housing 42 such that it partly surrounds the periphery of the main shaft 30; the sensor group 80 consisting of sensors 82 held by the sensor mount 70 and each capable of measuring the distance from a measurement target; and the control section 90 which, based on the results of measurement by the sensor group 80, controls the shaft-tilting translational drive unit 50 so as to correct the inclination θ of the main shaft 30 with respect to the workpiece 3. According to the machine tool 1 having such a construction, the shaft-tilting translational drive unit 50 can feed the sensors 82 together with the main shaft 30 in the axial direction of the axis r of rotation, and the sensors 82 can obtain information on the distances from a wall surface 3b that defines a hole 3a provided in the workpiece 3 or the distances from a wall surface 5b that defines a hole 5a provided in the reference-hole plate 5. This makes it possible to determine the inclination θ of the main shaft 30 with respect to the workpiece 3. The inclination θ of the main shaft 30 with respect to the workpiece 3 can be easily adjusted by controlling the shaft-tilting translational drive unit 50 so that the inclination θ of the main shaft 30 with respect to the workpiece 3 becomes smaller.

According to this embodiment, the sensor group 80 consists of small sensor groups 81 each consisting sensors 82 arranged in the rotational direction d1 of the axis r of rotation. Each small sensor group 81 can determine the distance between the center line C5 of a hole 5a of the reference-hole plate 5 and the axis r of rotation in a plane perpendicular to the axis r of rotation and in which the small sensor group 81 is located. Further, according to this embodiment, the small sensor groups 81 are arranged along the axial direction of the axis r of rotation. The distance between the center line C5 of a hole 5a of the reference-hole plate 5 and the axis r of rotation can be compared between the planes perpendicular to the axis r of rotation and in which the small sensor groups 81 are located. This comparison can determine the inclination θ of the main shaft 30 with respect to the workpiece 3.

According to this embodiment, the control section 90 controls the shaft-tilting translational drive unit 50 to feed the main shaft 30 together with the sensor group 80 in the axial direction of the axis r of rotation at least to a certain feed position (e.g. the position shown in FIG. 6), where sensors 82 of the sensor group 80, at different positions in the axial direction of the axis r of rotation, measure the distances from a wall surface 5b that defines a hole 5a of the reference-hole plate 5. Based on the results of the measurement, the control section 90 can determine the inclination θ of the main shaft 30 with respect to the workpiece 3. This can correct, before machining a hole 3a of the workpiece 3, at least the inclination of the main shaft 30 with respect to the workpiece 3 due to a positioning error upon mounting of the workpiece 3 on the workpiece holder 20.

Further, according to this embodiment, the control section 90 controls the shaft-tilting translational drive unit 50 to feed the main shaft 30 together with the sensor group 80 in the axial direction of the axis r of rotation past certain different feed positions. At each of the different feed positions (e.g. the positions shown in FIGS. 6 and 7) of the main shaft 30, sensors 82 of the sensor group 80, at different positions in the axial direction of the axis r of rotation, measure the distances from a wall surface 5b that defines a hole 5a of the reference-hole plate 5. Based on the results of measurement performed by the sensor group 80 at the different feed positions, the control section 90 can determine the inclination θ of the main shaft 30 with respect to the workpiece 3 at that feed position (e.g. the position shown in FIG. 6) independently of the inclination θ of the main shaft 30 with respect to the workpiece 3 at any other feed position (e.g. the position shown in FIG. 7). This makes it possible to machine the hole 3a of the workpiece 3 while controlling the shaft-tilting translational drive unit 50 so that the inclination θ of the main shaft 30 with respect to the workpiece 3 becomes smaller even when the inclination θ of the main shaft 30 with respect to the workpiece 3 varies at the different feed positions of the main shaft 30 in the axial direction of the axis r of rotation.

According to this embodiment, the amount of correction of the inclination of the main shaft 30 with respect to the workpiece 3, as made by the control section 90 at each of the different feed positions (e.g. the positions shown in FIGS. 8 and 9) of the main shaft 30 in the axial direction of the axis r of rotation, corresponds to, in particular corresponds exactly to, the inclination of the main shaft 30 with respect to the workpiece 3 determined from the results of measurement, performed by the sensors 82 at the same feed position (e.g. the position shown in FIG. 6 or 7), of the distances between the sensors 82 and the wall surface 5b that defines the hole 5a of the reference-hole plate 5. Thus, the inclination θ of the main shaft 30 with respect to the workpiece 3 at each of the different feed positions can be corrected by utilizing the inclination θ of the main shaft 30 with respect to the workpiece 3 determined from the results of actual measurement performed by the sensors 82 at the same feed position using the reference-hole plate 5. This can correct and minimize the inclination θ of the main shaft 30 with respect to the workpiece 3.

According to this embodiment, the control section 90 is configured to correct the inclination θ of the main shaft 30 with respect to the workpiece 3 according to the feed of the main shaft 30 in the axial direction of the axis r of rotation. This makes it possible to perform machining of a hole 3a of the workpiece 3 while controlling the shaft-tilting translational drive unit 50 so that the inclination θ of the main shaft 30 with respect to the workpiece 3 always becomes smaller even when the inclination θ of the main shaft 30 with respect to the workpiece 3 changes with the feed of the main shaft 30 in the axial direction of the axis r of rotation.

Though in the above-described embodiment the inclination θ of the main shaft 30 with respect to the workpiece 3 is adjusted by measuring the distances between the sensors 82 and a wall surface 5b that defines a hole 5a of the reference-hole plate 5, it is also possible to adjust the inclination θ of the main shaft 30 with respect to the workpiece 3 by measuring the distances between the sensors 82 and a wall surface 3b that defines a hole 3a of the workpiece 3 without using the reference-hole plate 5.

More specifically, the control section 90 controls the shaft-tilting translational drive unit 50 to feed the main shaft 30 together with the sensor group 80 in the axial direction of the axis r of rotation at least to a certain feed position, where sensors 82 of the sensor group 80, at different positions in the axial direction of the axis r of rotation, measure the distances from a wall surface 3b that defines a hole 3a of the workpiece 3. Based on the results of the measurement, the control section 90 can determine the inclination θ of the main shaft 30 with respect to the workpiece 3. This can correct, before machining the hole 3a of the workpiece 3, at least the inclination of the main shaft 30 with respect to the workpiece 3 due to a positioning error upon mounting of the workpiece 3 on the workpiece holder 20.

In a further embodiment, the control section 90 controls the shaft-tilting translational drive unit 50 to feed the main shaft 30 together with the sensor group 80 in the axial direction of the axis r of rotation past certain different feed positions. At each of the different feed positions of the main shaft 30, sensors 82 of the sensor group 80, at different positions in the axial direction of the axis r of rotation, measure the distances from a wall surface 3b that defines a hole 3a of the workpiece 3. Based on the results of measurement performed by the sensor group 80 at the different feed positions, the control section 90 can determine the inclination θ of the main shaft 30 with respect to the workpiece 3 at that feed position independently of the inclination θ of the main shaft 30 with respect to the workpiece 3 at any other feed position. This makes it possible to machine the hole 3a of the workpiece 3 while controlling the shaft-tilting translational drive unit 50 so that the inclination θ of the main shaft 30 with respect to the workpiece 3 becomes smaller even when the inclination θ of the main shaft 30 with respect to the workpiece 3 varies at the different feed positions of the main shaft 30 in the axial direction of the axis r of rotation.

In the above-described embodiment the machine tool 1 has a relatively long stroke; for example, the range of movement in the X-axis direction is 10.5 m, the range of movement in the Y-axis direction is 2.5 m, and the range of movement in the Z-axis direction is 1.0 m. However, the present invention is not limited to such a long-stroke machine tool. A long stroke is not necessarily required for the machine tool 1 if it can machine with high accuracy a hole 3a disposed in a peripheral area of a large-sized workpiece 3 e.g. having a diameter of about 1.5 m. For example, a machine tool constructed as a horizontal boring machine, may have a coarsely rotating mechanism for a large-sized workpiece separately from a main shaft. Such a machine tool can be a portable machine having a significantly short stroke. A machine tool, which is configured to move in the range of up to 500 mm in each of the X-, Y- and Z-axes by means of a translational movement section, could achieve positioning accuracy on the order of 0.1 μm by using a flexible combination of various high-precision mechanical elements (a linear motor drive, a hydrostatic guide, etc.). In such a short-stroke machine, a constant-temperature chamber may be provided to shield a space around a machining point, thereby minimizing the environmental change and increasing the machining accuracy.

The modifications described above can of course be made in an appropriate combination to the above-described embodiment.

For example, it is possible to measure, prior to machining, the inclination θ of the axis r of rotation with respect to the workpiece 3 in advance by using a contact-type probe installed instead of the main shaft 30, and to reflect the measured value in finish boring so as to make the inclination θ smaller. It should be noted, however, that the in-process measurement of the above-described embodiment can achieve higher measurement accuracy.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the invention.

The invention claimed is:

1. A machine tool for machining a hole of a desired size in a workpiece, comprising:
    a body portion;
    a workpiece holder for holding the workpiece, supported on the body portion;
    a main shaft which holds a tool;
    a spindle unit including a spindle which holds the main shaft rotatably on the axis of rotation, and a housing which covers the periphery of the spindle;
    a shaft-tilting translational drive unit for holding the spindle unit in such a manner as to be capable of changing the inclination of the main shaft, held by the spindle unit, with respect to the workpiece, and for moving the spindle unit relative to the body portion;
    a sensor mount secured to the housing and extending from the housing such that it partly surrounds the periphery of the main shaft;
    a sensor group consisting of sensors held by the sensor mount and each capable of measuring the distance from a measurement target; and
    a control section which, based on the results of measurement by the sensor group, controls the shaft-tilting translational drive unit so as to correct the inclination of the main shaft with respect to the workpiece, wherein the control section controls the shaft-tilting translational drive unit to feed the main shaft together with the sensor group in an axial direction of said axis of rotation so that the control section inserts the sensor group into a hole provided in the workpiece or a hole provided in a reference-hole plate mounted to a main shaft-facing surface of the workpiece; and
    the sensor group, when inserted into the hole provided in the workpiece, measures the distances from a wall surface that defines the hole provided in the workpiece, or when inserted into the hole provided in the reference-hole plate, measures the distances from a wall surface that defines the hole provided in the reference-hole plate.

2. The machine tool according to claim 1, wherein the sensor group consists of small sensor groups each consisting of sensors arranged in the rotational direction of said axis of rotation, and wherein the small sensor groups are arranged in the axial direction of said axis of rotation.

3. The machine tool according to claim 1, wherein the control section controls the shaft-tilting translational drive unit to feed the main shaft together with the sensor group in the axial direction of said axis of rotation at least to a certain feed position, wherein when the main shaft lies at the certain feed position, sensors of the sensor group, at different positions in the axial direction of said axis of rotation, measure the distances from the wall surface that defines the hole provided in the workpiece, and wherein based on the results of the measurement, the control section can determine the inclination of the main shaft with respect to the workpiece.

4. The machine tool according to claim 1, wherein the control section controls the shaft-tilting translational drive unit to feed the main shaft together with the sensor group in the axial direction of said axis of rotation past certain different feed positions, wherein at each of the different feed positions of the main shaft, sensors of the sensor group, at different positions in the axial direction of said axis of rotation, measure the distances from the wall surface that defines the hole provided in the workpiece, and wherein based on the results of measurement performed by the sensor group at the different feed positions, the control section can determine the inclination of the main shaft with respect to the workpiece at that feed position independently of the inclination of the main shaft with respect to the workpiece at any other feed position.

5. The machine tool according to claim 1, wherein the control section controls the shaft-tilting translational drive unit to feed the main shaft together with the sensor group in the axial direction of said axis of rotation at least to a certain feed position, wherein when the main shaft lies at the certain feed position, sensors of the sensor group, at different positions in the axial direction of said axis of rotation, measure the distances from the wall surface that defines the hole provided in a reference-hole plate mounted to a main shaft-facing surface of the workpiece, and wherein based on the results of the measurement, the control section can determine the inclination of the main shaft with respect to the workpiece.

6. The machine tool according to claim 1, wherein the control section controls the shaft-tilting translational drive unit to feed the main shaft together with the sensor group in the axial direction of said axis of rotation past certain different feed positions, wherein at each of the different feed positions of the main shaft, sensors of the sensor group, at different positions in the axial direction of said axis of rotation, measure the distances from the wall surface that defines the hole provided in a reference-hole plate mounted to a main shaft-facing surface of the workpiece, and wherein based on the results of measurement performed by the sensor group at the different feed positions, the control section can determine the inclination of the main shaft with respect to the workpiece at that feed position independently of the inclination of the main shaft with respect to the workpiece at any other feed position.

7. The machine tool according to claim 6, wherein the amount of correction of the inclination of the main shaft with respect to the workpiece, as made at each of different feed positions of the main shaft in the axial direction of said axis of rotation, corresponds to the inclination of the main shaft with respect to the workpiece determined from the results of measurement, performed by the sensors of the sensor group at the same feed position, of the distances between the sensors and the wall surface that defines the hole provided in the reference-hole plate.

8. The machine tool according to claim 4, wherein the control section is configured to correct the inclination of the main shaft with respect to the workpiece according to the feed of the main shaft in the axial direction of said axis of rotation.

9. The machine tool according to claim 1, wherein the shaft-tilting translational drive unit includes a shaft tilting section for holding the spindle unit in such a manner as to be capable of changing the inclination of the main shaft, held by the spindle unit, with respect to the workpiece, and for moving the spindle unit closer to and away from the workpiece, and a translational drive section for moving the shaft tilting section relative to the body portion.

* * * * *